UNITED STATES PATENT OFFICE 2,157,113

PRESERVATION OF FERMENTABLE MATERIALS

Thomas S. Carswell, Glendale, Mo., assignor to Monsanto Chemical Company, St. Louis, Mo., a corporation of Delaware No Drawing. Application May 20, 1937,
Serial No. 143,729

6 Claims. (Cl. 21—2)

The present invention relates to methods of preserving organic materials susceptible to decomposition or fermentation by micro-organisms and refers particularly to the preservation of casein and fermentable starches and sugars, for example, dextrin.

The invention is based upon the unexpected observation that when applied to casein, sugars and starches, the bactericidal and fungicidal value of polychlorophenols and their salts is greatly improved by admixture therewith of metallic salts of boric acids. Borates, which by themselves exhibit but slight effects in inhibiting the growth of micro-organisms, greatly increase the effect of the polychlorophenols for this purpose. By use of the invention, that is, by taking advantage of the synergistic or activating effect of borates upon polychlorophenols, it is possible to inhibit the growth of micro-organisms with smaller concentrations of polychlorophenols than was heretofore possible.

This synergistic or activating action of borates upon polychlorophenols is exercised only in the presence of fermentable carbohydrate materials and casein but not in the presence of glue. It therefore appears to be a specific and not a general action. The synergistic effect is exhibited in the presence of fermentable carbohydrate materials in general and certain nitrogenous or proteinaceous materials of the casein type. The action, furthermore, appears to be limited specifically to borates, and is not exhibited by ammonium hydroxide, sodium hydroxide, sodium chloride and a great number of other inorganic substances.

The invention is particularly adapted to the preservation of starch, dextrin and casein dispersions, emulsions and pastes. Sugar solutions and the like may also be preserved in this manner. The procedure for the use of a mixture of polychlorophenols and borax is analogous to that known to the art for the use of other preservatives. When used in aqueous media the polychlorophenol is used preferably in the form of a soluble salt, for example, as a sodium or potassium salt together with soluble alkali borates, for example, borax. In general, equal parts by weight of the alkali polychlorophenate and the borate are used in admixture but the relative proportions of the two components may be varied widely. By preliminary test the proportions to be used with a particular material can be readily determined. Specific preferred proportions for the preservation of particular materials are indicated in the examples cited hereinafter.

The polychlorophenols particularly contemplated by the present invention are trichlorophenols, tetrachlorophenols and pentachlorophenol.

Examples of typical methods of using the invention and the advantages accruing therefrom follow. It is to be understood that the invention is not limited to these specific examples but is susceptible of departure therefrom in manners well understood in the art.

Example 1.—A starch paste is made from the following ingredients: 8.25% starch, 0.33% beef tallow, 0.11% sulfonated castor oil (Nopco 1597) and 91.31% water. Various preservatives in varying amounts are incorporated into pastes of this composition by first dissolving the preservative in water and adding this water to correspond to the quantity used in the preparation of the paste as above indicated. The pastes containing the various preservatives are then inoculated with micro-organisms, for example, the black mold, Aspergillus niger, and allowed to stand at room temperature.

To inhibit growth of Aspergillus niger for at least 140 or more days in such starch pastes the following proportions of various preservatives are required, the percentages indicating parts by weight of the preservative (on the weight of starch present) which must be incorporated into the total paste:

| | Per cent |
|---|---|
| A. Pentachlorophenol | 1 |
| B. Borax (no preservative effect). | |
| C. Sodium salt of benzyl-o-chlorophenol | ½–1 |
| D. Borax+A (equal parts) | 0.1–0.25 |
| E. Borax+C | 1 |

It is evident that toward benzyl-o-chlorophenol, borax has no synergistic action. On pentachlorophenol, borax has a pronounced effect. When mixed with borax the quantity of pentachlorophenol which is used to attain the same preserving action can be reduced from ⅛ to ½₀ of the amount necessary without the admixture of borax.

These results are illustrative of results obtained with a wide variety of preservatives, the effect being limited in the case of starch pastes solely to polychlorophenols typified by pentachlorophenol and to borates as activating agents therefor.

In applying the invention to starch compositions, the proportion of polychlorophenol required to maintain sterility when used with an equal proportion of a borate is reduced to the order of about 10% of that required when the polychlorophenol is used alone without an activator.

Example 2.—To batches of a dispersion of 10 parts by weight of casein in 90 parts by weight of water are added various proportions of various preservatives. These batches are inoculated with a fermentation organism and observed regularly.

To prevent the growth of the black mold, Aspergillus niger, and to prevent putrefactive decomposition, in a 10% casein solution containing 15% ammonia as a solubilizing agent, for at least 140 days at room temperature, the following percentages of the preservatives (on the weight of the casein present) where required:

| | Per cent |
|---|---|
| A. Sodium pentachlorophenate | 1 |
| B. Sodium tetrachlorophenate | 2 |
| C. Phenol | 4 |
| D. p-Chloro-m-cresol | 1 |

A similar dispersion of 10 parts by weight of casein and, in addition, 1.25 parts by weight of borax is made with sufficient water to yield a total of 100 parts. This is inoculated in the same manner and allowed to stand at the same temperature and under the same conditions as the previous batch. When borax is added with the preservatives, the percentages of preservative required to inhibit growth of Aspergillus niger for 140 days were as follows:

| | Per cent |
|---|---|
| E. Sodium pentachlorophenate | 0.3 |
| F. Sodium tetrachlorophenate | 1.0 |
| G. Phenol | 4 |
| H. p-Chloro-m-cresol | 2 |

It is evident that with casein only the polychlorophenols were activated by borax.

Inasmuch as the examples merely constitute preferred embodiments, the invention is to be limited only by such restrictions which have been indicated in the description hereinbefore and are defined in the appended claims.

What I claim is:

1. The method of preventing the growth of micro-organisms in an organic material subject to decomposition thereby, selected from the group consisting of fermentable sugars and starches and caseic proteins, which comprises adding to said material a mixture of a polychlorophenol and an activating agent consisting of a metallic borate.

2. The method as defined in claim 1 and further characterized in that the mixture added consists of sodium pentachlorophenate and borax as an activating agent therefor.

3. The method as defined in claim 1 and further characterized in that the mixture added consists of a sodium tetrachlorophenate and borax as an activating agent therefor.

4. A composition of matter embodying an organic material subject to decomposition by microorganisms selected from the group consisting of fermentable sugars and starches and caseic proteins, and a preservative therefor consisting of a polychlorophenol and an activating substance consisting of a metallic borate.

5. A composition of matter as defined in claim 4 and further characterized in that the preservative consists of sodium pentachlorophenate and borax.

6. A composition as defined in claim 4 and further characterized in that the preservative consists of sodium tetrachlorophenate and borax.

THOMAS S. CARSWELL.